United States Patent [19]

McCarthy

[11] Patent Number: 5,424,786
[45] Date of Patent: Jun. 13, 1995

[54] LATERAL VISION CONTROLLING DEVICE

[76] Inventor: Gerald T. McCarthy, 11 Malibu Crescent, St. Catharines, Ontario, Canada, L2M 7A1

[21] Appl. No.: 200,182

[22] Filed: Feb. 22, 1994

[51] Int. Cl.$^6$ ............................................. G02C 7/16
[52] U.S. Cl. .................................... 351/46; 351/177
[58] Field of Search ................ 351/41, 45, 46, 177, 351/162, 163, 164, 165

[56] References Cited

U.S. PATENT DOCUMENTS

| | | | |
|---|---|---|---|
| 2,875,670 | 12/1954 | Thornton | 351/45 |
| 3,421,233 | 10/1966 | Gaal | 351/45 |
| 3,967,885 | 7/1976 | Byler | 351/46 |
| 5,151,720 | 9/1992 | Kanbar | 351/46 |
| 5,243,460 | 9/1993 | Kornberg | 351/162 |

FOREIGN PATENT DOCUMENTS 287653  3/1928  United Kingdom ................ 351/45

*Primary Examiner*—William L. Sikes
*Assistant Examiner*—Huy Mai
*Attorney, Agent, or Firm*—Benman Collins & Sawyer

[57] ABSTRACT

A lateral vision controlling device is disclosed which decreases or eliminates visual stimuli entering one of the hemispheres of the brain. The device includes a pair of lenses, with each lens having a transparent portion and a masked portion. The masked portion reduces visual stimuli entering the side of the person's eyes that corresponds to the hemisphere of the brain in which the visual stimuli is to be reduced. With a person having a dominant hemisphere of the brain, it is advantageous to reduce or eliminate visual stimuli entering the other hemisphere of the brain.

15 Claims, 5 Drawing Sheets

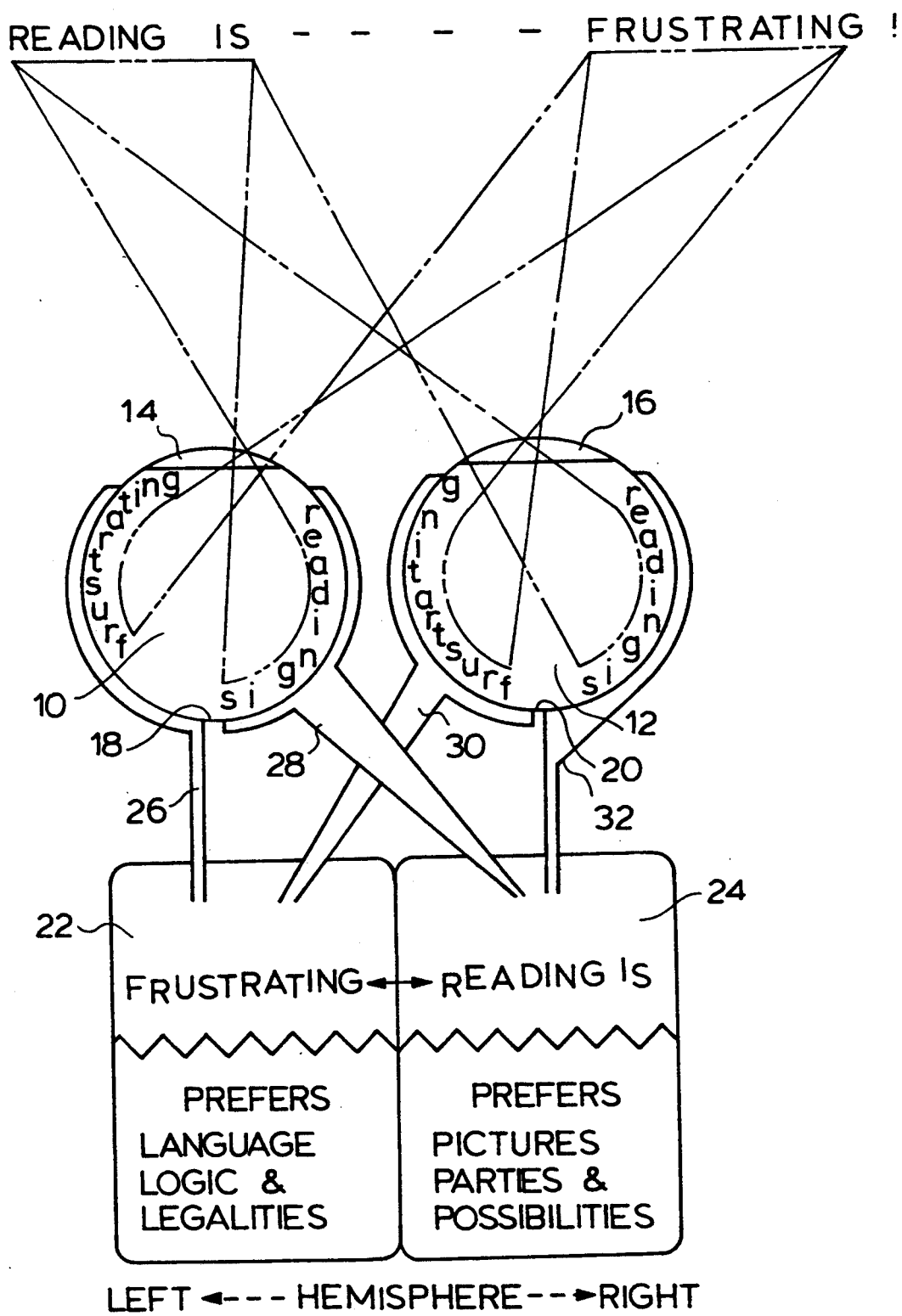

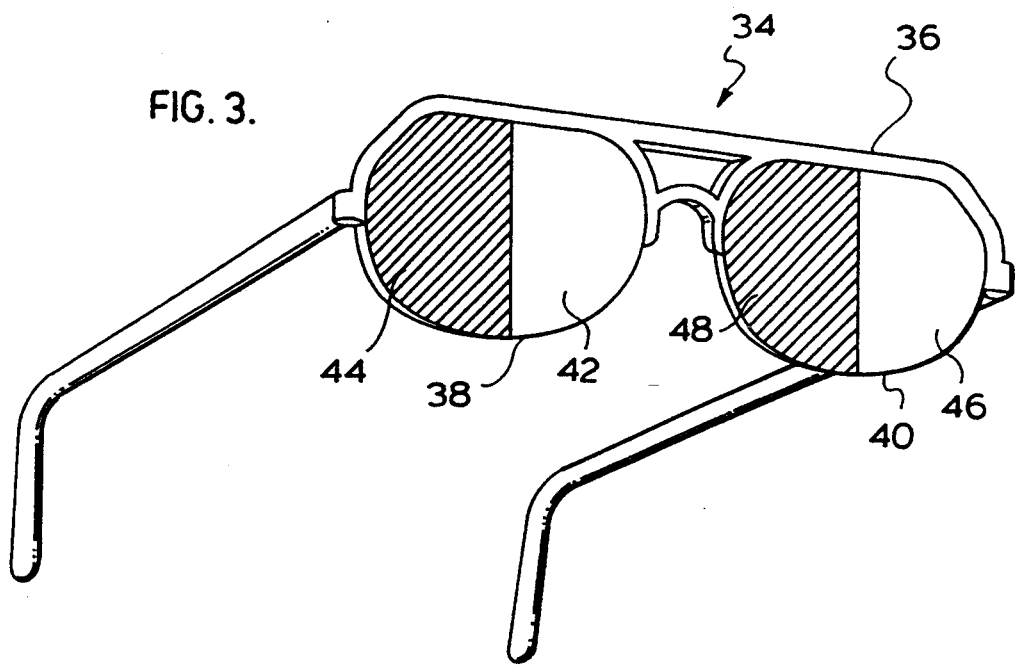
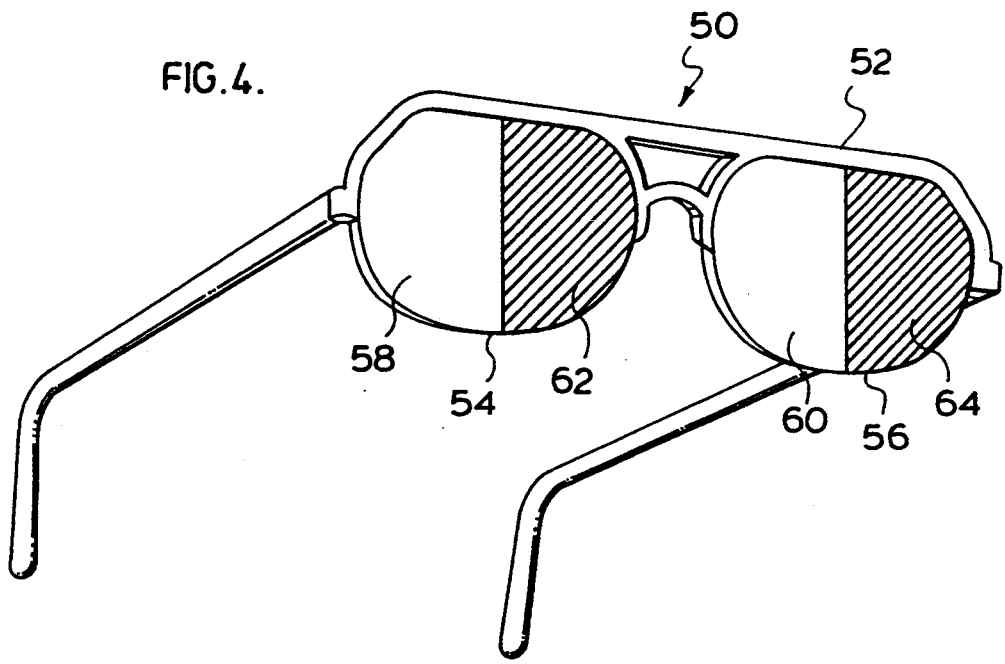

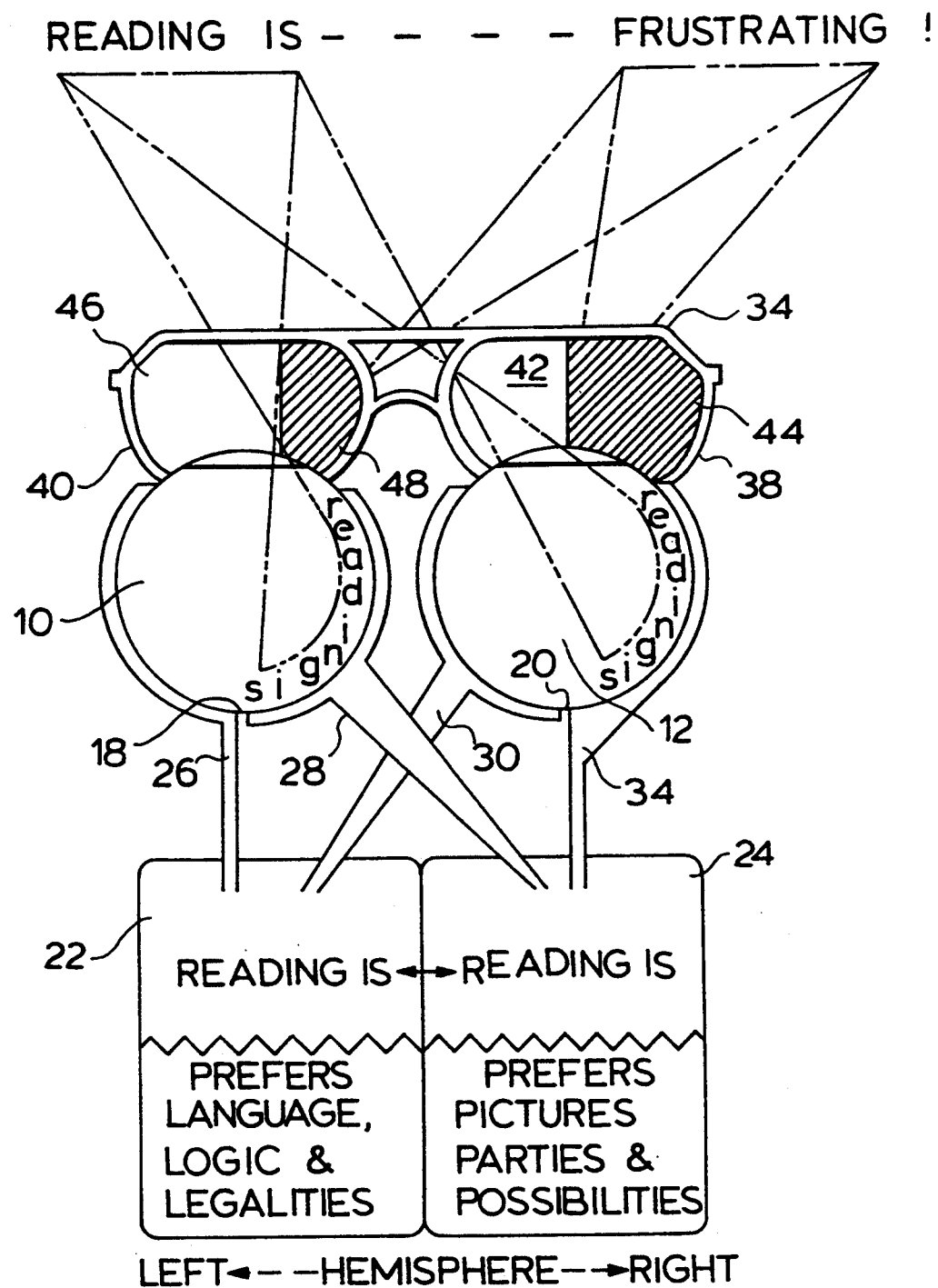

LATERAL VISION CONTROLLING DEVICE

FIELD OF INVENTION

The present invention relates to a vision controlling device, and more particularly to a device used for controlling the lateral vision of a person, thereby decreasing or eliminating visual stimuli entering one of the hemispheres of the brain.

BACKGROUND TO THE INVENTION

All sensory stimuli has an effect either consciously or unconsciously on the human brain. Stimuli from the five senses play an essential role in a person's life. Normally, a person will adjust the level of stimuli to his or her brain so as to cope with the continuous flow of information. For example, a person will wear hearing plugs, apply perfume, etc. The aim of these adjustments is to provide a calming effect on a person's brain by reducing or altering the stimuli received from the various senses.

It is well known that the human brain is divided into two hemispheres, the right hemisphere and the left hemisphere. It has been found that the right hemisphere appears to have a proficiency or interest in processing pictures, spacial relations and emotions. On the other hand, the left hemisphere has been found to have a proficiency with logic, language and legalities.

Although the two hemispheres of the brain normally work in conjunction with one another, many people exhibit a natural talent or an aptitude for using one particular hemisphere more than the other. Such a person will have a dominant hemisphere such that the person will be more proficient in the skills associated with his or her dominant hemisphere. However, such a person would also be less interested in the activities associated with the less dominant hemisphere.

For example, a right hemisphere dominant person would be more proficient and have more interest in unstructured creativity, etc. On the other hand, a left hemisphere dominant person would be more proficient in languages and structures.

Each human eye is independently connected to both of the hemispheres of the brain. That is, a person's left eye is independently connected to both the left hemisphere and the right hemisphere, and the person's right eye is independently connected to both the left hemisphere and the right hemisphere.

Visual stimuli to the brain plays a vital role not only in distinguishing objects clearly, but also in reading. Since it is the left hemisphere of the brain that has a proficiency or interest in reading, it is preferable to have the left hemisphere available to assist the right hemisphere with the task of reading. Similarly, for a person who has difficulties in appreciating the visual arts, it is preferable to have the right hemisphere available to assist the left hemisphere with the task of processing this type of information.

It would, accordingly, be advantageous for a right hemisphere dominant person to reduce the natural visual stimuli going to the left hemisphere so that the left hemisphere is made available to assist the right hemisphere in completing the task of reading. Similarly, a left hemisphere dominant person will not usually display as great an interest in unstructured creativity as compared to a right hemisphere dominant person. However, by reducing or eliminating the natural visual stimuli going to the right hemisphere, the right hemisphere can assist the left hemisphere with the artistic task.

There are in the prior art several patents that disclose partially blocked or obstructed lenses of eye glasses. Most of these patents are concerned, however, with spectacles in which the blockages or working lens serve to protect against glare from night driving. For example, U.S. Pat. No. 3,111,675 discloses goggles in which the lenses of the goggles are separated into two distinct portions. One portion of the lens is of transparent material whereas the other portion is also transparent, but is coloured so as to absorb some of the light and therefore reduce glare.

U.S. Pat. No. 3,421,233 issued to Gaal teaches the masking of spectacles to condition the eyes for reading. This patent discloses that the location of the masking means on the lenses is defined by reference to the lines of sight which are blocked. The effect of the masking means is to reduce visual stimuli from all sources, except for the printed page that is to be read.

Also, recently the Irlen Institute has found that the use of coloured lenses in spectacles has a beneficial effect on certain individuals who experience various kinds of reading disorders. The Irlen Institute claims that the use of coloured lenses helps in diminishing a condition known as "Scotopic Sensitivity Syndrome".

Furthermore, Optometrists have recently been prescribing "Mono Vision" lenses in which one contact lens is placed on one eye for distance and a functionally different lens is placed on the other eye for reading. That is, each of the lenses serve a different function.

However, none of the prior art discloses a device and method for reducing visual stimuli to one hemisphere of the brain so that one hemisphere is available to assist the other.

Accordingly, it is an object of an aspect of the present invention to provide a device that reduces or eliminates visual stimuli to one side of a person's eyes. This in turn will reduce stimulation of a particular hemisphere of the brain. A further object of an aspect of the present invention is to provide a method of conditioning a person's eyes so that visual stimuli to a particular hemisphere of the brain is reduced or eliminated.

SUMMARY OF THE INVENTION

According to an aspect of the present invention, a lateral vision controlling device is provided for use by a person with a dominant hemisphere of the brain, comprising,
  a) a pair of lenses adapted to be worn over the person's eyes;
  b) each said lens having a transparent portion and a masked portion;
  c) said masked portion on each said lens being adapted to reduce visual stimuli entering one side of the person's eyes; and
  d) said masked portion is on a side of each said lens corresponding to the hemisphere of the brain on which the visual stimuli is reduced.

According to another aspect of the present invention there is provided a method of conditioning the eyes of a person so that visual stimuli to a particular hemisphere of the brain is reduced, the method comprising,
  a) wearing a pair of transparent lenses over the person's eyes; and
  b) masking a portion of each said lens so as to reduce visual stimuli entering one side of each of the person's eyes.

BRIEF DESCRIPTION OF THE DRAWINGS

Embodiments of the present invention are illustrated in the accompanying drawings, in which like numerals denote like parts throughout the several views and in which:

FIG. 2 is a schematic diagram illustrating the difficulties experienced by a right hemisphere dominant person when reading;

FIG. 3 is a front elevational view of eye glasses adapted to reduce the stimuli entering the left hemisphere of the brain according to the present invention;

FIG. 4 is a front elevational view of eye glasses adapted to reduce the visual stimuli entering the right hemisphere of the brain according to the present invention;

FIG. 5 is a schematic diagram showing how the eye glasses of FIG. 3 aid in the task of reading by a right hemisphere dominant person;

DETAILED DESCRIPTION OF THE PREFERRED EMBODIMENT

Figure 1:
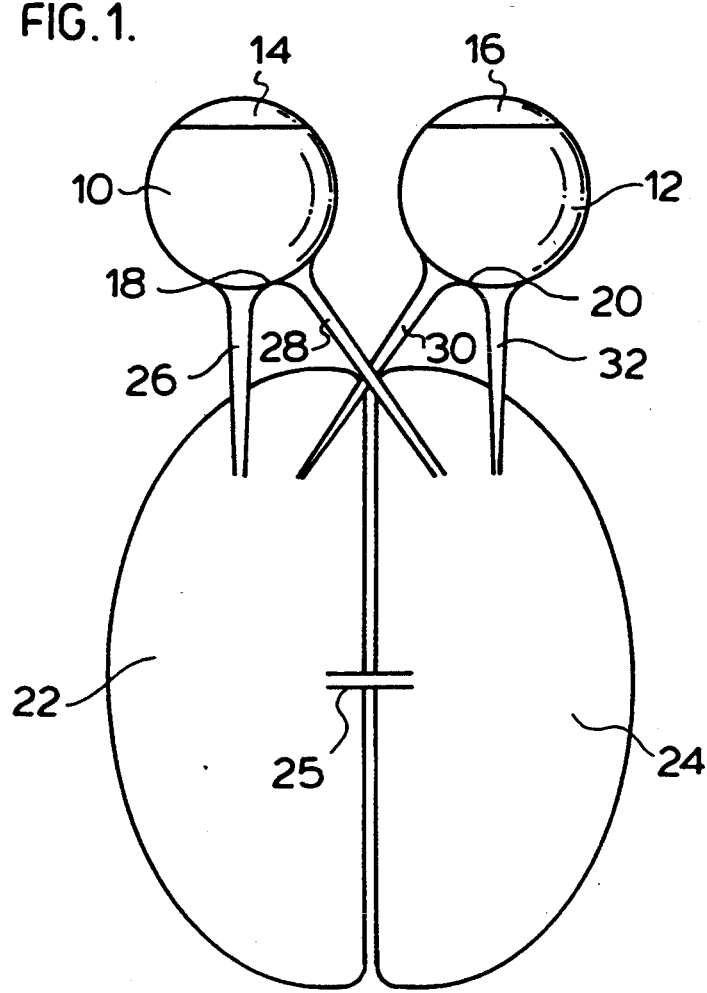
FIG. 1 is a schematic diagram showing the interconnection of a person's eyes to each hemisphere of the brain by axons which are contained within each optical nerve.

In FIG. 1, there is shown a schematic diagram of the interconnection between a person's eyes 10 and 12 and the person's two hemispheres 22 and 24 of the brain. As is well known, each of the eyes 10 and 12 comprise an iris, 14 and 16 respectively, through which visual stimuli is received and transmitted to the back portions of the eyes 10 and 12.

The back portions of eyes 10 and 12 include the retinas 18 and 20. Visual stimuli entering iris 14 and 16 are transmitted to retinas 18 and 20 respectively. The image or signal received by retinas 18 and 20 is then transmitted to the person's brain.

A person's brain comprises two separate, yet connected, hemispheres, the left hemisphere 22 and the right hemisphere 24. The hemispheres 22 and 24 are connected through the corpus callosum 25. The retinas 18 and 20 are connected to each of the hemispheres 22 and 24 of the brain via optical nerves comprising millions of axons. It is the function of the optical nerves to transmit the images or signals from retinas 18 and 20 to each of hemispheres 22 and 24.

With respect to the left eye 10, axons 26 connect the left side of retina 18 to the left hemisphere 22, whereas axons 28 connect the right side of retina 18 to the right hemisphere 24. Similarly, with respect to the right eye 12, axons 30 connect the left side of retina 20 to the left hemisphere 22 whereas axons 32 connect the right side of retina 20 to the right hemisphere 24.

In FIG. 2, visual processing of written information is illustrated in schematic form, wherein visual stimuli enter a person's eyes and are transmitted to each of the hemispheres of the brains for interpretation. FIG. 2 also shows in detail how the axons in the optical nerves are connected to each of the eyes 10 and 12. With respect to left eye 10, axons 26 are connected to the left hand side of retina 18 so that visual stimuli applied thereto is transmitted to the left hemisphere 22. Similarly, axons 28 are connected to the right hand side of retina 18 so that visual stimuli applied thereto is transmitted to the right hemisphere 24. Therefore, the axons in each optical nerve transmits to the respective hemisphere of the brain only those stimuli that fall in their respective sides of retina 18.

The same is also the case with right eye 12. Axons 30 transmit visual stimuli from the left hand side of retina 30 to the left hemisphere 22. On the other hand, axons 32 transmit visual stimuli from the right hand side of right retina 30 to the right hemisphere 24. Accordingly, the visual stimuli entering eye 12 is directed by axons 30 and 32 to a different hemisphere of the brain depending on which side of eye 12 and retina 20 the visual stimuli fall on.

FIG. 2 also illustrates the difficulties experienced by right hemisphere dominant person when that person is required to process different words in each hemisphere of the brain at the same time. In FIG. 2, the words being read are "READING IS FRUSTRATING". As illustrated, the words "READING IS", are on the left hand side of the page being read by the person. The visual stimuli received by the person when reading those words are seen to enter eyes 10 and 12 through iris 14 and 16 from the left. Iris 14 and 16 then transmit those visual stimuli to retinas 18 and 20 respectively. Since the words "READING IS" enter eyes 10 and 12 from the left hand side, they are transmitted through iris 14 and 16 and fall onto the right hand portions of retinas 18 and 20.

Any images or signals falling on the right hand portion of retinas 18 and 20 are transmitted to the right hemisphere 24 of the brain by axons 28 and 32 respectively. Axons 26 and 30 respectively do not transmit the image or signal of "READING IS" as the visual stimuli from both words do not fall onto the portion of retinas 18 and 20 where optical nerves 26 and 30 are located.

Similarly, the word "FRUSTRATING", being on the right hand side of the page being read, enters eyes 10 and 12 and is transmitted onto the left hand portion of retinas 18 and 20. As can be seen from FIG. 2, the left hand portion of eyes 10 and 12 is serviced by axons 26 and 30 respectively. Axons 26 and 30 are connected to left hemisphere 22 so that the image or signal of "FRUSTRATING" enters left hemisphere 22 only, not right hemisphere 24.

The resulting situation at a particular point in time is that left hemisphere 22, which prefers language, logic and legalities, sees the word "FRUSTRATING" whereas right hemisphere 24, which prefers pictures, emotions and special relations, sees the words "READING IS".

If the person reading the phrase "READING IS FRUSTRATING" is a right hemisphere dominant person, that person will tackle the task of reading with much less enthusiasm and interest than a left hemisphere dominant person. A right hemisphere dominant person will experience difficulties in reading the phrase "READING IS FRUSTRATING" as the right hemisphere 24, which is the person's strongest hemisphere, sees the words "READING IS". However, that hemisphere does not show proficiency in reading. On the other hand, the left hemisphere 22, which is proficient with reading, sees the word "FRUSTRATING". Therefore, the left hemisphere is not available to assist the right hemisphere 24 with the task of reading the words "READING IS" since left hemisphere 22 is occupied with processing the information for "FRUS- TRATING". The result is that the person has difficulty in reading the words "READING IS".

If visual stimuli entering the left hemisphere 22 is reduced or eliminated, the left hemisphere 22 will then be available to assist the right hemisphere 24 with the task of reading. That is, in a right hemisphere dominant person, if no stimuli is received by left hemisphere 22 during the course of reading, the left hemisphere 22 will assist the right hemisphere 24. This is because both hemispheres 22 and 24 are connected together, however, left hemisphere 22 cannot assist right hemisphere 24 if left hemisphere 22 is also processing information at the same time.

Similarly, in a left hemisphere dominant person, right hemisphere 24 can be made available to assist left hemisphere 22 if the right hemisphere 24 does not receive any visual stimuli and has no information to process.

Shown in FIGS. 3 and 4 are lateral vision controlling devices made in accordance with the present invention and adapted to reduce or eliminate visual stimuli entering one of the hemispheres of the brain. It is to be noted that, although the devices shown in FIGS. 3 and 4 are modified eye glasses, it is understood that any and all forms of vision related eye wear, such as a contact lenses or goggles, may be used and modified in accordance with this invention.

In FIG. 3, the lateral vision controlling device 34 shown is essentially a pair of eye glasses. Device 34 comprises a supporting frame 36 and two lenses 38 and 40. Lenses 38 and 40 are supported and held by supporting frames 36 in a well known manner. The lateral vision controlling device 34 as shown in FIG. 3 is adapted to reduce or eliminate the visual stimuli normally processed by the left hemisphere 22 of a person's brain. Each of lenses 38 and 40 are divided into two distinct portions: a transparent portion and masked portion. Referring specifically to lens 38, there is shown a transparent portion 42 and masked portion 44. The device 34 illustrated in FIG. 3 is shown in front elevational view. The masked portion 44 is illustrated as being on the right hand side of a person wearing the device 34.

Accordingly, masked portion 44 of lens 38 is adapted to reduce or eliminate any visual stimuli entering the person's eye from the right hand side and transmitted to and processed by the left hemisphere 22 of the brain. Similarly, lens 40 is divided into a transparent portion 46 and a masked portion 48. It is to be noted that masked portion 48 is on the same side of lens 40 as masked portion 44 is on lens 38.

Thus, when a person wears the device 34, all visual stimuli received from the right hand side is reduced or eliminated. The result is that little or no visual stimulus enters left hemisphere 22. Left hemisphere 22 can therefore assist a right hemisphere dominant person in the task of reading since there is no information for it to process.

In FIG. 4, there is illustrated a lateral vision controlling device 50 similar to the device 34. Device 50 comprises a supporting frame 52 and two lenses 54 and 56. Each of lenses 54 and 56 are divided into a transparent portion 58 and 60 respectively, and a masked portion 62 and 64 respectively. Device 50 in FIG. 4 is adapted to reduce or eliminate visual stimuli received from the left hand side and transmitted to the right hemisphere 24. Accordingly, the right hemisphere 24 of a left hemisphere dominant person is free and available to assist in processing the visual stimuli entering left hemisphere 22.

As mentioned earlier, masked portions 44 and 48 of lenses 38 and 40 are adapted to reduce or eliminate visual stimuli entering the person's eyes. That is, masked portions 44 and 48 may be adapted to absorb light or the masked portions 44 and 48 may be opaque thereby preventing light from being transmitted through them.

Figure 6:
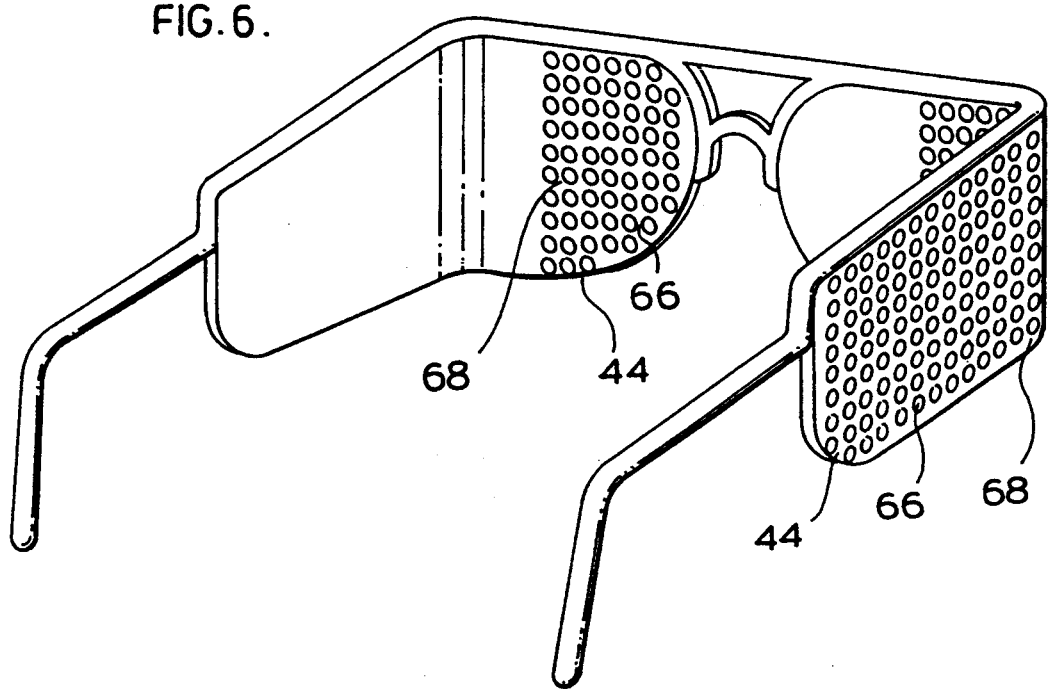
FIG. 6 is a front elevational view of a further embodiment of the present invention.
Figure 7:
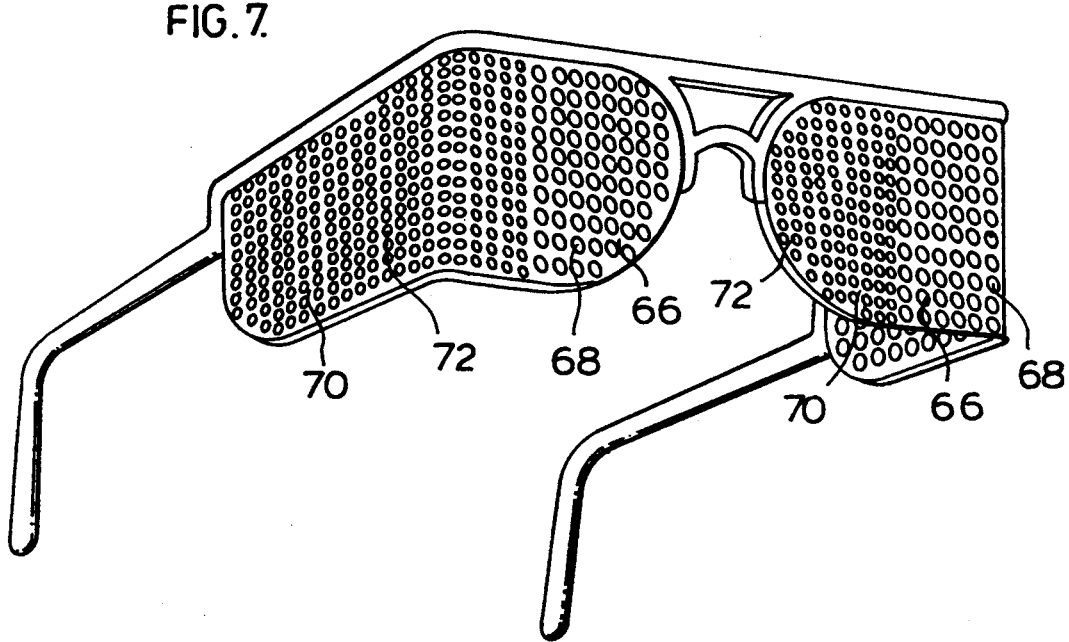
FIG. 7 is a front elevational view of yet a further embodiment of the present invention.

Referring specifically to device 34 in FIG. 3, lenses 38 and 40 can be typical, well known optical lens. Masked portions 44 and 48 can be constructed in any known way, such as attaching masking means onto a portion of lenses 38 and 40. Typical masking means can include tinting or colouring of lenses 38 and 40, adhesive tape glued onto lenses 38 and 40 or masking members supported onto supporting frame 36. The masking means can also include opaque covers on lenses 38 and 40, with a suitably located hole in each cover. The masking means can further include masking members having a plurality of holes of varying density, as shown in FIGS. 6 and 7 and described in greater detail below.

In FIG. 5, there is shown a schematic diagram of the effect that the lateral vision controlling device 34 has on a right hemisphere dominant person. In FIG. 5, the phrase "READING IS FRUSTRATING" is being read by the person, as was the case in FIG. 2. As is shown, lateral vision controlling device 34 is placed between the words being read and the person's eyes 10 and 12. Lenses 38 and 40 of device 34 contain the masked portions 44 and 48 on the right hand side of the person. As such, visual stimuli received from the right hand side of the person is reduced or eliminated by masked portions 44 and 48.

With respect to eye 10, masked portion 48 is shown in FIG. 5 to eliminate all visual stimuli resulting from the word "FRUSTRATING". However, transparent portion 46 of lens 40 allows visual stimuli from the words "READING IS" to enter eye 10. Similarly, masked portion 44 eliminates all visual stimuli from the word "FRUSTRATING" whereas transparent portion 42 permits visual stimuli from the words "READING IS" to enter eye 12.

Accordingly, the only visual stimuli entering eyes 10 and 12 is from the words "READING IS". Those visual stimuli are projected onto the right hand side of retinas 18 and 20 of eyes 10 and 12 respectively. Axons 28 and 32 therefore transmit the visual stimuli "READING IS" to right hemisphere 24. On the other hand, since there is no visual stimuli projected onto the left hand side of retinas 18 and 20, axons 16 and 30 do not transmit anything to left hemisphere 22. Since left hemisphere 22 has no information to process, it is available to assist and aid right hemisphere 24 in deciphering and processing the information received by right hemisphere 24.

In a right hemisphere dominant person who experiences difficulties in reading, lateral vision controlling device 34 causes the left hemisphere 22 to be available to assist the right hemisphere 24 with the task, therefore increasing the reading capability of such a person. Similarly, in a left hemisphere dominant person, lateral vision controlling device 50 shown in FIG. 4 will reduce or eliminate in the same manner as shown in FIG. 5 visual stimuli entering the right hemisphere 24. Therefore, a left hemisphere dominant person who experiences difficulties with unstructured creativity for example, has the right hemisphere 24 available to assist the left hemisphere 22 in processing the visual information.

In FIGS. 6 and 7, there is shown two further embodiments of the present invention. In FIG. 6, the masked portions 44 consists of opaque covers 66 and a plurality of holes 68. The opaque covers 66 and holes 68 reduce the visual stimuli entering that side of the eyes.

The device of FIG. 7, on the other hand, includes opaque covers 66 and holes 68, but also opaque covers 70, which also have a plurality of holes 72. However the density or concentration of holes 72 is different from the density or concentration of holes 68, thereby permitting different amounts of visual stimuli to enter the opposite sides of the eyes.

While several embodiments of this invention have been illustrated in the accompanying drawings and described hereinabove, it will be evident to those skilled in the art that changes and modification may be made therein without departing from the essence of this invention, as put forth in the appended claims.

I claim:

1. A lateral vision controlling device for use by a person with a dominant hemisphere of the brain, comprising:
   a) a pair of lenses adapted to be worn over the person's eyes as vision related eye wear;
   b) each said lens having a transparent portion and a masked portion;
   c) said masked portion on each said lens being adapted to reduce visual stimuli entering one side of the person's eyes; and
   d) said masked portion is on a side of each said lens corresponding to the hemisphere of the brain on which the visual stimuli is reduced.

2. The device claimed in claim 1, wherein the pair of lenses are supported by eye glass frames.

3. The device claimed in claim 2, wherein the masked portion on each said lens is adapted to reduce visual stimuli entering the left side of each of the person's eyes.

4. The device claimed in claim 3, wherein the masked portion on each said lens covers substantially one half of said lens.

5. The device claimed in claim 2, wherein the masked portion on each said lens is adapted to reduce visual stimuli entering the right side of each of the person's eyes.

6. The device claimed in claim 5, wherein the masked portion on each said lens covers substantially one half of said lens.

7. The device claimed in claim 1, wherein said masked portion on each said lens is opaque.

8. The device claimed in claim 1, wherein said masked portion on each said lens is coloured.

9. The device claimed in claim 1, wherein said masked portion on each said lens comprises an opaque cover on which a hole is located.

10. The device claimed in claim 1, wherein said masked portion on each said lens comprises an opaque cover on which a plurality of holes is located.

11. The device claimed in claim 1, wherein the pair of lenses are contact lenses.

12. A method of conditioning the eyes of a person so that visual stimuli to a particular hemisphere of the brain is reduced, said method comprising:
   a) wearing a pair of transparent lenses over the person's eyes as vision related eye wear; and
   b) masking a portion of each said lens so as to reduce visual stimuli entering one side of each of the person's eyes.

13. The method claimed in claim 11, further comprising the step of reading printed matter.

14. The method claimed in claim 11, further comprising the step of working with visual matter.

15. A lateral vision controlling device for use by a person with a dominant hemisphere of the brain, comprising:
   a) a pair of lenses supported by a supporting frame adapted to be worn over the person's eyes as vision related eye wear;
   b) each said lens having a transparent portion and a masked portion;
   c) said masked portion on each said lens being adapted to reduce visual stimuli entering one side of the person's eyes; and
   d) said masked portion is on a side of each said lens corresponding to the hemisphere of the brain on which the visual stimuli is reduced.

* * * * *

UNITED STATES PATENT AND TRADEMARK OFFICE
CERTIFICATE OF CORRECTION

PATENT NO.   : 5,424,786
DATED        : June 13, 1995
INVENTOR(S)  : Gerald T. McCarthy It is certified that error appears in the above-indentified patent and that said Letters Patent is hereby corrected as shown below:

```
Column    Line
  8        24   delete "11" and insert --12--.
  8        26   delete "11" and insert --12--.
```

Signed and Sealed this

Eighteenth Day of June, 1996

Attest:

BRUCE LEHMAN

*Attesting Officer*     *Commissioner of Patents and Trademarks*